(12) United States Patent
Elshafie et al.

(10) Patent No.: US 11,696,299 B2
(45) Date of Patent: Jul. 4, 2023

(54) INDICATION OF UNOCCUPIED DATA CHANNEL OCCASION

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 77 days.

(21) Appl. No.: 17/220,653

(22) Filed: Apr. 1, 2021

(65) Prior Publication Data

US 2022/0322405 A1    Oct. 6, 2022

(51) Int. Cl.
*H04W 72/23* (2023.01)
*H04L 5/00* (2006.01)
*H04W 72/1273* (2023.01)

(52) U.S. Cl.
CPC .......... *H04W 72/23* (2023.01); *H04L 5/0051* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 2019/0068317 A1* | 2/2019 | Babaei | H04W 72/0446 |
| 2019/0191450 A1* | 6/2019 | Guo | H04W 72/23 |
| 2019/0230694 A1* | 7/2019 | Lyu | H04W 72/23 |
| 2019/0312711 A1* | 10/2019 | Stern-Berkowitz | H04L 5/0053 |
| 2019/0335496 A1* | 10/2019 | Li | H04L 1/1819 |
| 2020/0068602 A1* | 2/2020 | Liu | H04W 76/27 |
| 2021/0360683 A1* | 11/2021 | Chen | H04W 72/0453 |
| 2021/0385826 A1* | 12/2021 | Moon | H04L 1/0038 |
| 2022/0007230 A1* | 1/2022 | Chen | H04W 72/0413 |
| 2022/0060985 A1* | 2/2022 | Xu | H04W 52/0229 |
| 2022/0330227 A1* | 10/2022 | Zhang | H04W 72/51 |
| 2022/0386355 A1* | 12/2022 | Yi | H04B 7/0695 |

* cited by examiner

*Primary Examiner* — Phirin Sam
(74) *Attorney, Agent, or Firm* — Shumaker & Sieffert, P.A.

(57) ABSTRACT

Certain aspects of the present disclosure provide techniques for indicating unoccupied data channel occasions for semi-persistent scheduling of wireless data communications. One aspect provides a method for wireless communication by a user-equipment (UE). The method generally includes: receiving, from a base station (BS), scheduling of resources for reception of multiple data channels; determining, based on a resource for a first data channel of the multiple data channels, an indication of whether transmission of at least a second data channel of the multiple data channels will be skipped; and taking one or more actions associated with communication with the BS in accordance with the indication.

29 Claims, 9 Drawing Sheets

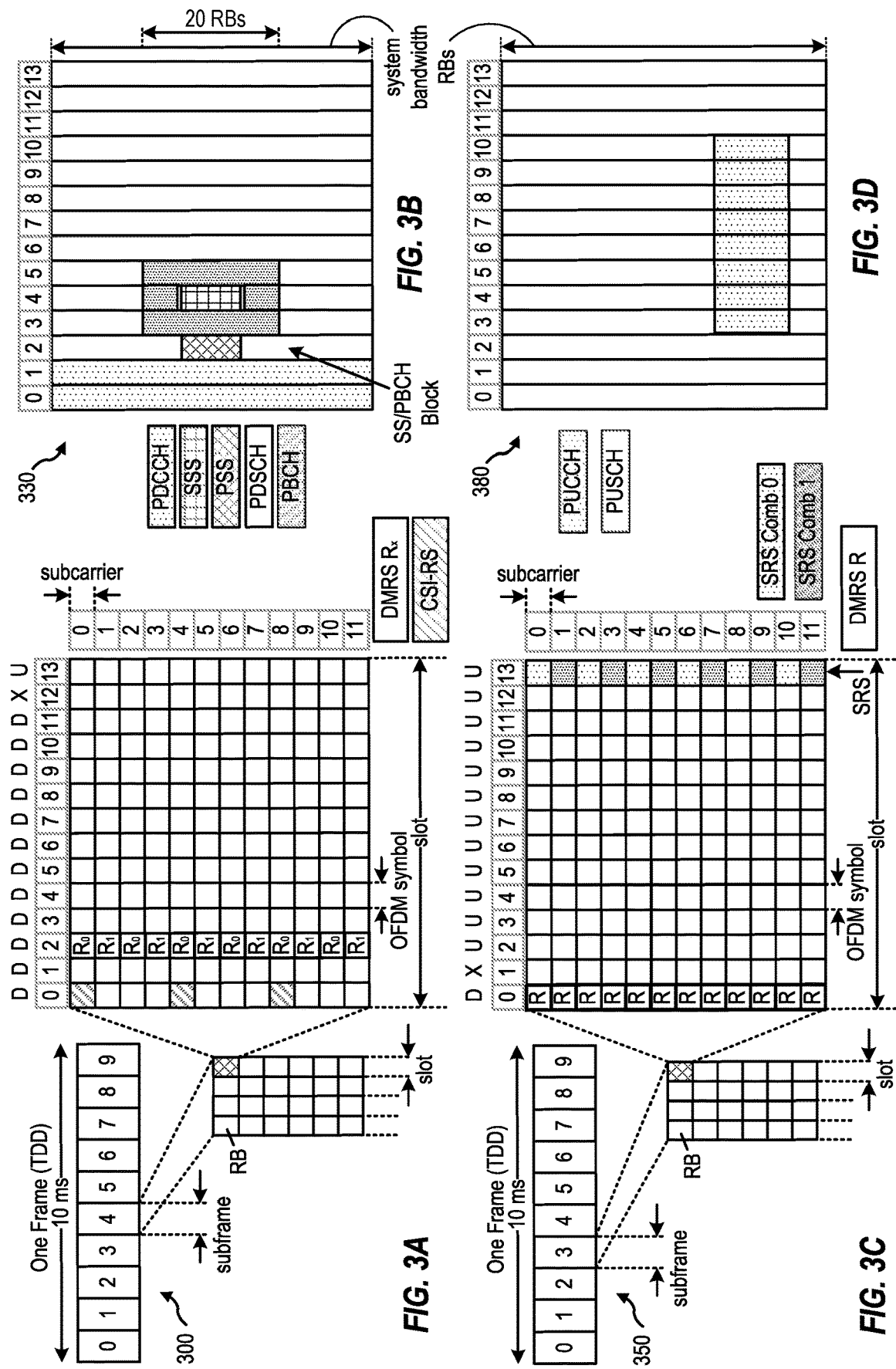

INDICATION OF UNOCCUPIED DATA CHANNEL OCCASION

INTRODUCTION

Aspects of the present disclosure relate to wireless communications, and more particularly, to techniques for indicating unoccupied data channel occasions for semi-persistent scheduling of wireless data communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user-equipment (UE). The method generally includes: receiving, from a base station (BS), scheduling of resources for reception of multiple data channels; determining, based on a resource for a first data channel of the multiple data channels, an indication of whether transmission of at least a second data channel of the multiple data channels will be skipped; and taking one or more actions associated with communication with the BS in accordance with the indication.

One aspect provides a method for wireless communication by a base station (BS). The method generally includes: transmitting, to a user-equipment (UE), scheduling of resources for transmission of multiple data channels; indicating, to the UE via a resource for a first data channel of the multiple data channels, whether the transmission of at least a second data channel of the multiple data channels will be skipped; and taking one or more actions associated with communication with the UE in accordance with the indication.

One aspect provides an apparatus for wireless communication by a UE. The apparatus generally includes a memory having executable instructions, and one or more processors configured to execute the executable instructions and cause the apparatus to: receive, from a BS, scheduling of resources for reception of multiple data channels; determine, based on a resource for a first data channel of the multiple data channels, an indication of whether transmission of at least a second data channel of the multiple data channels will be skipped; and take one or more actions associated with communication with the BS in accordance with the indication.

One aspect provides an apparatus for wireless communication by a base station (BS). The apparatus generally includes a memory having executable instructions, and one or more processors configured to execute the executable instructions and cause the apparatus to: transmit, to a user-equipment (UE), scheduling of resources for transmission of multiple data channels; indicate, to the UE via a resource for a first data channel of the multiple data channels, whether the transmission of at least a second data channel of the multiple data channels will be skipped; and take one or more actions associated with communication with the UE in accordance with the indication.

One aspect provides an apparatus for wireless communication by a UE. The apparatus generally includes: means for receiving, from a BS, scheduling of resources for reception of multiple data channels; means for determining, based on a resource for a first data channel of the multiple data channels, an indication of whether transmission of at least a second data channel of the multiple data channels will be skipped; and means for taking one or more actions associated with communication with the BS in accordance with the indication.

One aspect provides an apparatus for wireless communication by a BS. The apparatus generally includes: means for transmitting, to a UE, scheduling of resources for transmission of multiple data channels; means for indicating, to the UE via a resource for a first data channel of the multiple data channels, whether the transmission of at least a second data channel of the multiple data channels will be skipped; and means for taking one or more actions associated with communication with the UE in accordance with the indication.

One aspect provides a non-transitory computer-readable medium comprising executable instructions that, when executed by one or more processors of a UE, cause the UE to: receive, from a BS, scheduling of resources for reception of multiple data channels; determine, based on a resource for a first data channel of the multiple data channels, an indication of whether transmission of at least a second data channel of the multiple data channels will be skipped; and take one or more actions associated with communication with the BS in accordance with the indication.

One aspect provides a non-transitory computer-readable medium comprising executable instructions that, when executed by one or more processors of a BS, cause the BS to: transmit, to a UE, scheduling of resources for transmission of multiple data channels; indicate, to the UE via a resource for a first data channel of the multiple data channels, whether the transmission of at least a second data channel of the multiple data channels will be skipped; and take one or more actions associated with communication Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for indicating skipped data channel (e.g., physical downlink shared channel (PDSCH)) occasions. Multiple data channel occasions may be configured using semi-persistent scheduling (SPS). However, even when the SPS configuration is active, a base station (BS) may not transmit a data channel via one or more of the data channel occasions. Without prior knowledge of the one or more skipped data channel transmissions, the UE may still have to monitor for the data channels and transmit acknowledgement (ACK) or negative ACK (NACK) for the data channels, resulting in wasted power at the UE, interference with other nodes, and unnecessary processing by the BS when receiving the ACK or NACK. As used herein, a data channel occasion generally refers to a time period scheduled for transmission of a data channel.

In some aspects of the present disclosure, the BS may provide an indication to the UE via a data channel of whether one or more following data channel transmission are to be skipped. With the advanced notice of the one or more skipped data channel transmissions, the UE may forgo monitoring for those skipped data channels and forgo transmission of ACK or NACK for the skipped data channels, saving power at the UE, reducing interference with other nodes, and preventing unnecessary processing by the BS. Collectively, these benefits lead to better utilization of the finite medium over which wireless communications are performed in a wireless communication system.

In some aspects, demodulation signals may be used as indications of whether a data channel occasion will be utilized or skipped. For example, multiple types of demodulation reference signals may be configured at the UE, allowing the BS to use the different types of demodulation reference signals to indicate whether the one or more following data channel transmissions are skipped. For instance, if the BS includes a first type of demodulation reference signal on a data channel, the UE may know that the next data channel transmission will be skipped by the BS, and if the BS includes a second type of demodulation reference signal on the data channel, the UE may know that the next data channel transmission will not be skipped by the BS.

Introduction to Wireless Communication Networks

Figure 1:
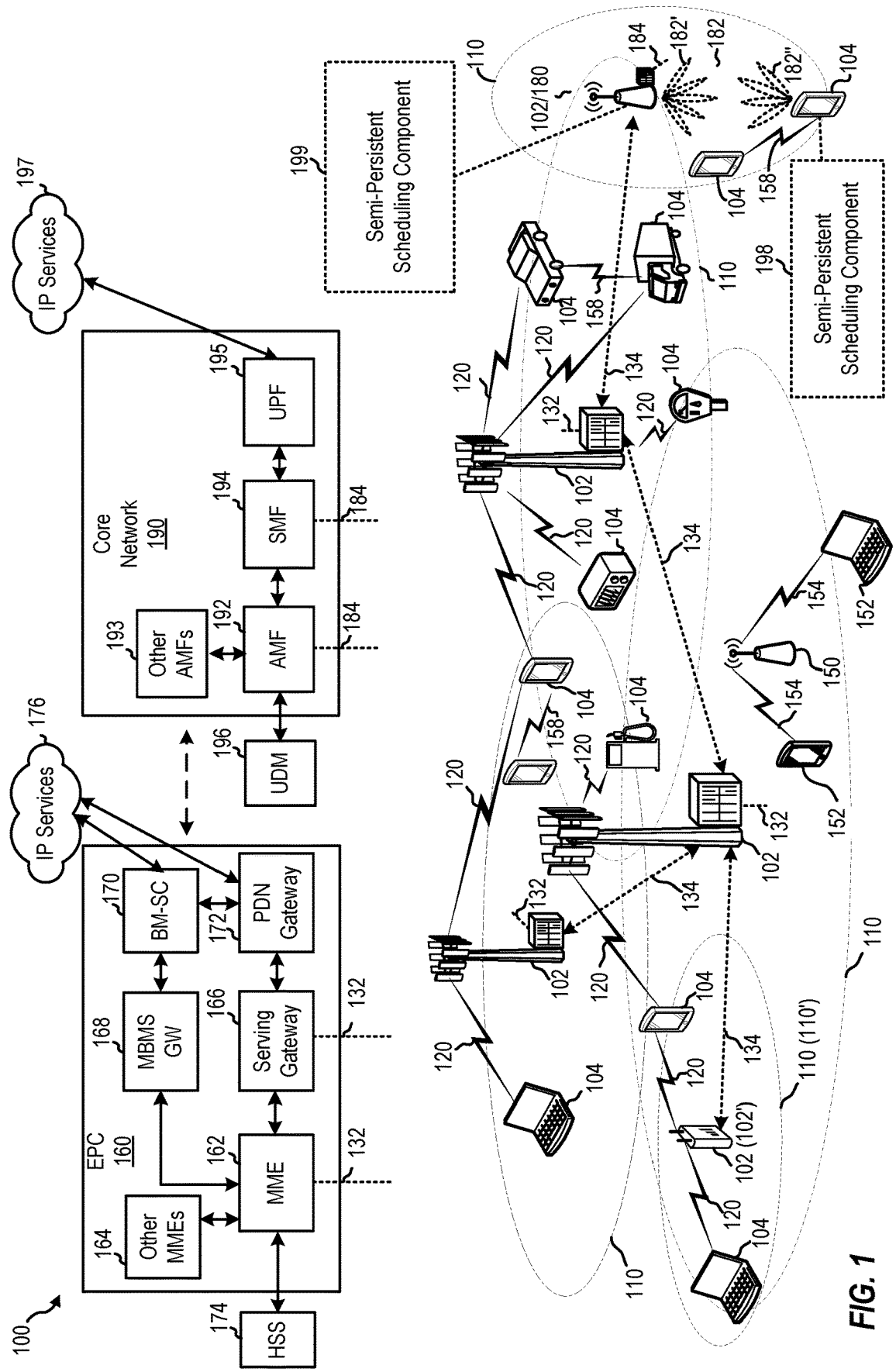
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes semi-persistent scheduling (SPS) component 199, which may be configured to indicate skipped data channel occasions configured via SPS. Wireless network 100 further includes SPS component 198, which may be used configured to receive an indication of skipped data channel occasions configured via SPS.

Figure 2:
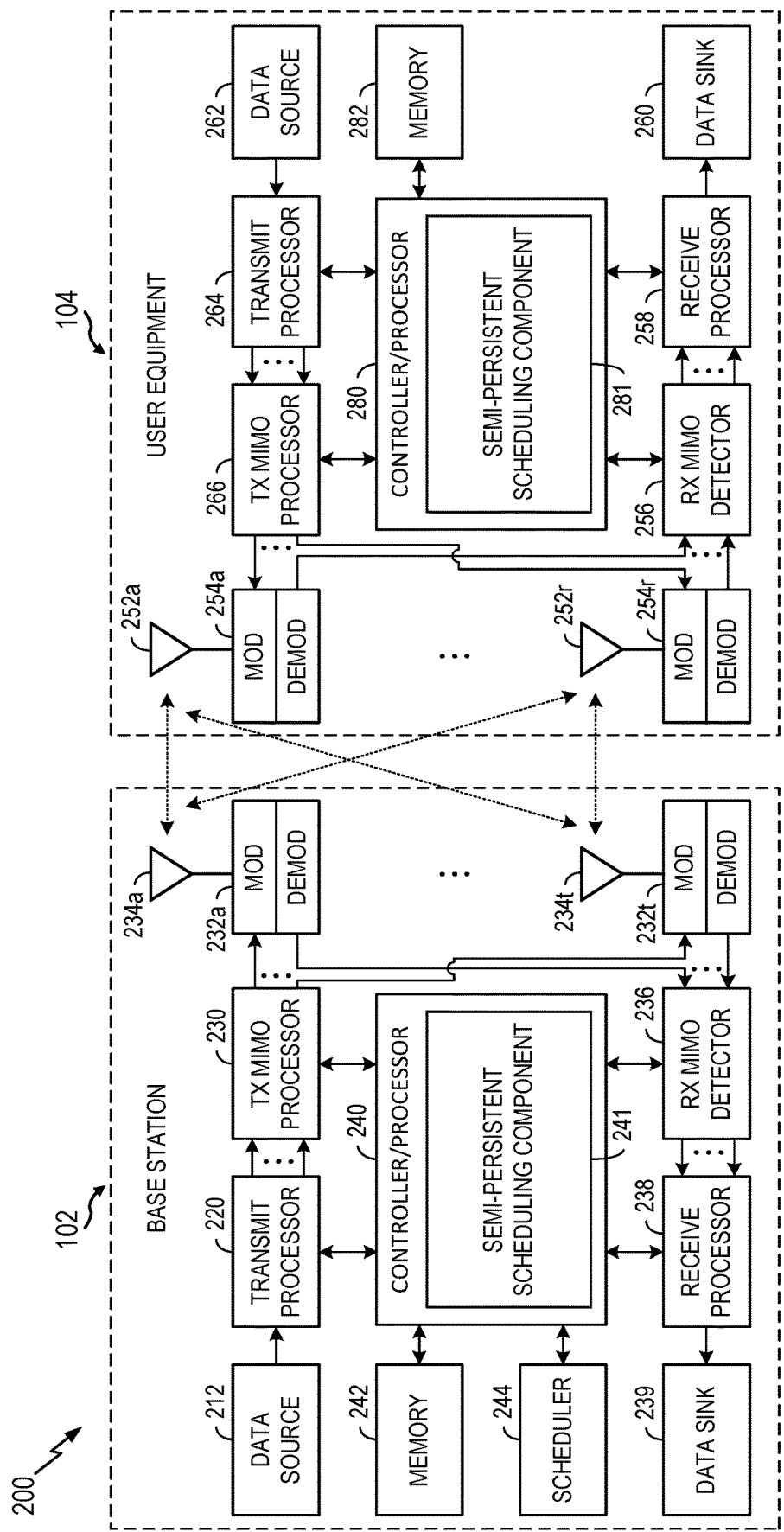
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes SPS component 241, which may be representative of SPS component 199 of FIG. 1. Notably, while depicted as an aspect of controller/processor 240, SPS component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes SPS component 281, which may be representative of SPS component 198 of FIG. 1. Notably, while depicted as an aspect of controller/processor 280, SPS component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Semi-Persistent Scheduling (SPS)

A semi-persistent scheduling (SPS) physical downlink shared channel (PDSCH) configuration may be configured using radio resource control (RRC) signaling. In some examples, the SPS configuration is configured with a certain timing parameter, such as K1, where K1 indicates the time that the UE should report a corresponding hybrid automatic repeat request (HARP)-acknowledgment (ACK) feedback for each data channel signal for the SPS. As used herein, a data channel may refer to a physical downlink shared channel (PDSCH). The SPS configuration may also include a periodicity (p), where the periodicity is the time between two consecutive SPS occasions (also referred to herein as data channel occasions, or data channel occasions). An SPS occasion generally refers to an occasion during which one the SPS configured data channels may be transmitted. In some cases, although an SPS configuration may be active, one or more of the SPS occasions may be empty (e.g., not have a data channel transmission), as described in more detail with respect to FIGS. 4A, 4B, and 4C.

Figure 4A:
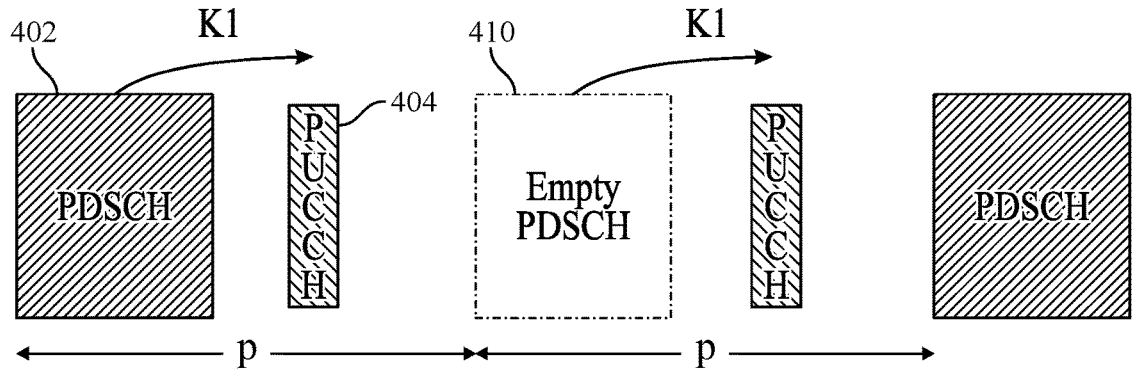
FIGS. 4A, 4B, and 4C illustrate example techniques for semi-persistent scheduling.
Figure 4B:
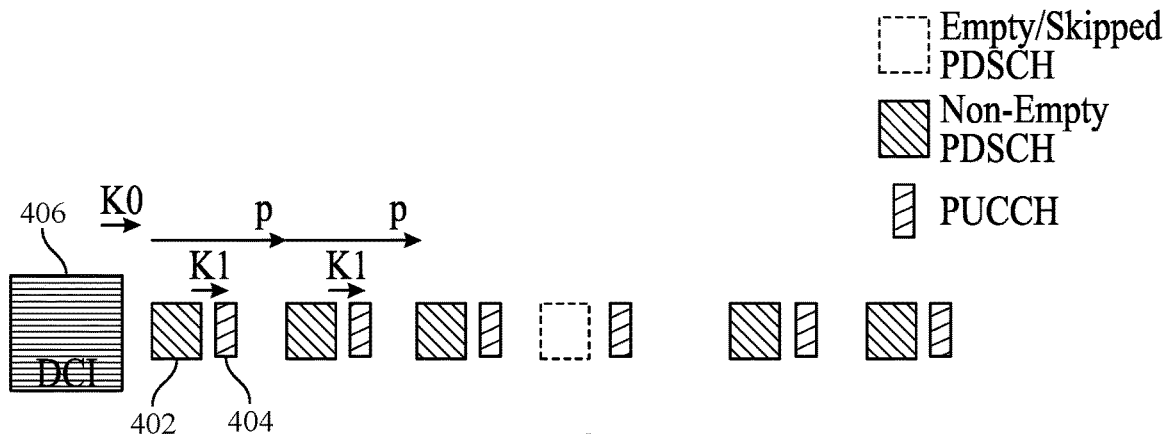
Figure 4C:
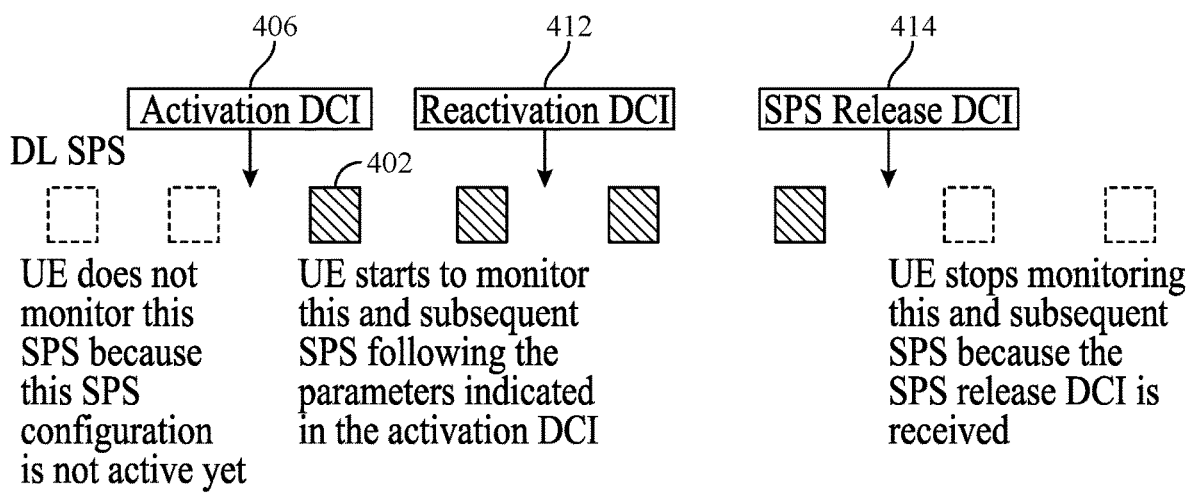

FIGS. 4A, 4B, and 4C illustrate example techniques for SPS. As described above, SPS occasions may be configured using RRC signaling. A data channel may be configured in each of the SPS occasions. For example, data channel 402 may be transmitted in an SPS occasion. The SPS occasions have a periodicity p, which represents the time between two consecutive SPS occasions (e.g., time from beginning of data channel 402 and beginning of resources 410), as shown.

RRC signaling configures the SPS periodicity (p) and HARQ-ACK feedback resources (e.g., resources for physical uplink control channel (PUCCH) 404). That is, each SPS occasion may have resources scheduled for a PUCCH. The PUCCH (e.g., PUCCH 404) may be used for acknowledgement (ACK) or negative ACK (NACK) of a corresponding data channel (e.g., data channel 402). As shown, one or more data channel transmissions during one or more SPS occasions may be skipped. For example, no data channel may be transmitted using resources 410 even though the resources 410 are configured for a data channel using SPS, as shown.

In some cases, SPS activation/reactivation downlink control information (DCI) and SPS release DCI may be used to activate or reconfigure data channel occasions. While SPS occasions may be configured via RRC signaling, DCI may be used to activate the configuration for SPS. As shown in FIG. 4B, the BS may use SPS activation DCI (e.g., DCI 406) to activate a certain configured SPS (e.g., data channel 402). In the activation DCI, the BS may indicate transmit (Tx) parameters such as modulation and coding scheme (MCS), resource block (RB) allocation, and antenna ports to be used for the SPS transmission.

As shown in FIG. 4C, prior to the activation DCI 406, the UE may not monitor for a data channel. The BS may use an SPS reactivation DCI 412 to change the transmit parameters for the UE, such as MCS, RB allocation, antenna ports of the SPS. The BS may also use an SPS release DCI 414 to deactivate a configured SPS. In other words, prior to receiving the activation DCI 406, the UE may not monitor the SPS because the SPS configuration is not yet active. After the activation DCI, the UE starts to monitor for data channels following the Tx parameters in the activation DCI. After receiving the SPS release DCI, the UE stops monitoring for the data channels.

Example Techniques for Indicating Skipped Data Channel

Some aspects of the present disclosure are directed to techniques that allow a UE to detect unused (e.g., skipped) data channel transmissions, resulting in reduced UE power consumption, reduced interference with other nodes on uplink (UL), and reduced processing by the BS. For example, if the UE is aware that a particular data channel is skipped, the UE can forgo monitoring and decoding during the corresponding SPS occasion, and forgo transmission of HARQ-ACK feedback. Forgoing the HARQ-ACK feedback reduces power consumption of the UE and reduces interference on the UL and saves related processing of the HARQ-ACK feedback at the BS.

Figure 5:
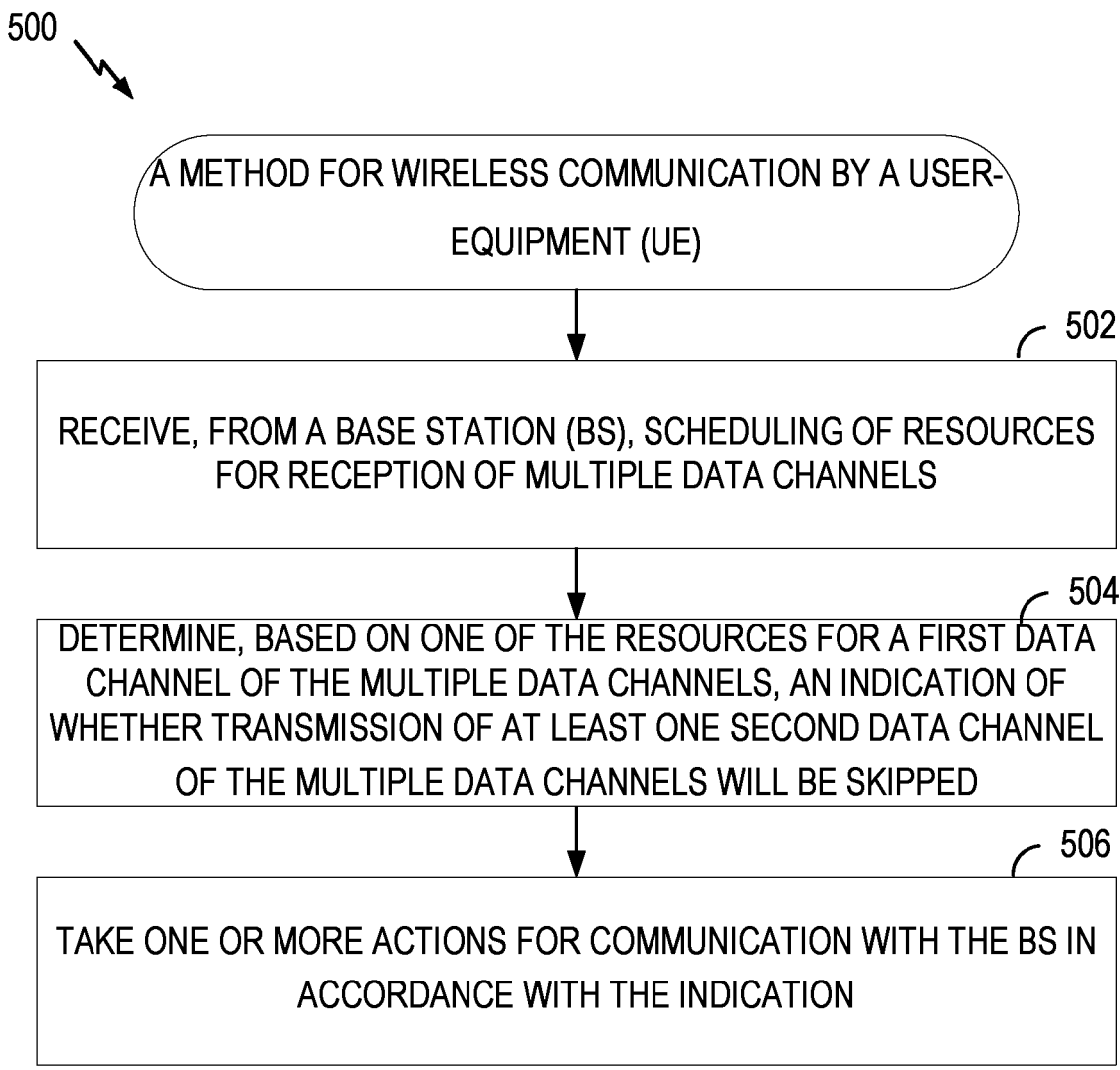
FIG. 5 is a flow diagram illustrating example operations for wireless communication by a user equipment.

FIG. 5 is a flow diagram illustrating example operations 500 for wireless communication, in accordance with certain aspects of the present disclosure. The operations 500 may be performed, for example, by a UE (e.g., such as a UE 104 in the wireless communication network 100 of FIG. 1).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 begin, at block 502, by receiving, from a BS, scheduling of resources for reception of multiple data channels. For example, the resources may be scheduled using SPS.

At block 504, the UE may determine, based on a resource for a first data channel (e.g., data channel 402 of FIG. 4) of the multiple data channels, an indication of whether transmission of at least a second data channel of the multiple data channels will be skipped. For example, the determination may be based on a type (e.g., a type of sequence) of reference signal (e.g., DMRS) received on the one of the resources. In other words, determining the indication of whether transmission of the second data channel will be skipped may include receiving a first type of reference signal via the first data channel, the first type of reference signal being configured to indicate that the transmission of the at least one second data channel (e.g., the next data channel scheduled via SPS to be received) will be skipped, or receiving a second type of reference signal via the first data channel, the second type of reference signal being configured to indicate that the transmission of the second data channel will occur.

In some aspects, determining the indication of whether transmission of the second data channel will be skipped may include monitoring the one of the resources for the first data channel, and determining that the first data channel was not received on the one of the resources based on the monitoring. Not receiving the first data channel may indicate that the transmission of the second data channel will occur.

In some aspects, the second data channel is one of at least two data channels. In other words, the indication determined at block 504 may indicate whether at least two data channels are skipped. Moreover, the indication of whether the transmission of the at least two data channels will be skipped may be determined based on at least one transmission pattern associated with the at least two data channels. For example, the at least one transmission pattern may indicate (e.g., via a corresponding bitmap) whether each of the at least two data channels is skipped during a corresponding one of the resources. For example, the transmission pattern may indicate that a data channel transmission in a first upcoming data channel occasion is skipped, a data channel transmission in a second upcoming data channel occasion will occur, and a data channel transmission in a third upcoming data channel occasion is skipped.

In some cases, the at least one transmission pattern may include multiple transmission patterns. In other words, multiple transmission pattern options may be configured and selectable. In this case, the UE may receive another message (e.g. DCI) identifying (e.g., via a bitmap index) one of the multiple transmission patterns, and the indication of whether the transmission of the at least two data channels will be skipped may be determined based on the identified one of the multiple transmission patterns.

At block 506, the UE may take one or more actions associated with communication with the BS in accordance with the indication. For example, if it is determined that the second data channel will be skipped, the one or more actions may involve determining to forgo monitoring for the second data channel, and in some cases, determining to forgo transmitting HARQ signaling for the second data channel.

Figure 6:
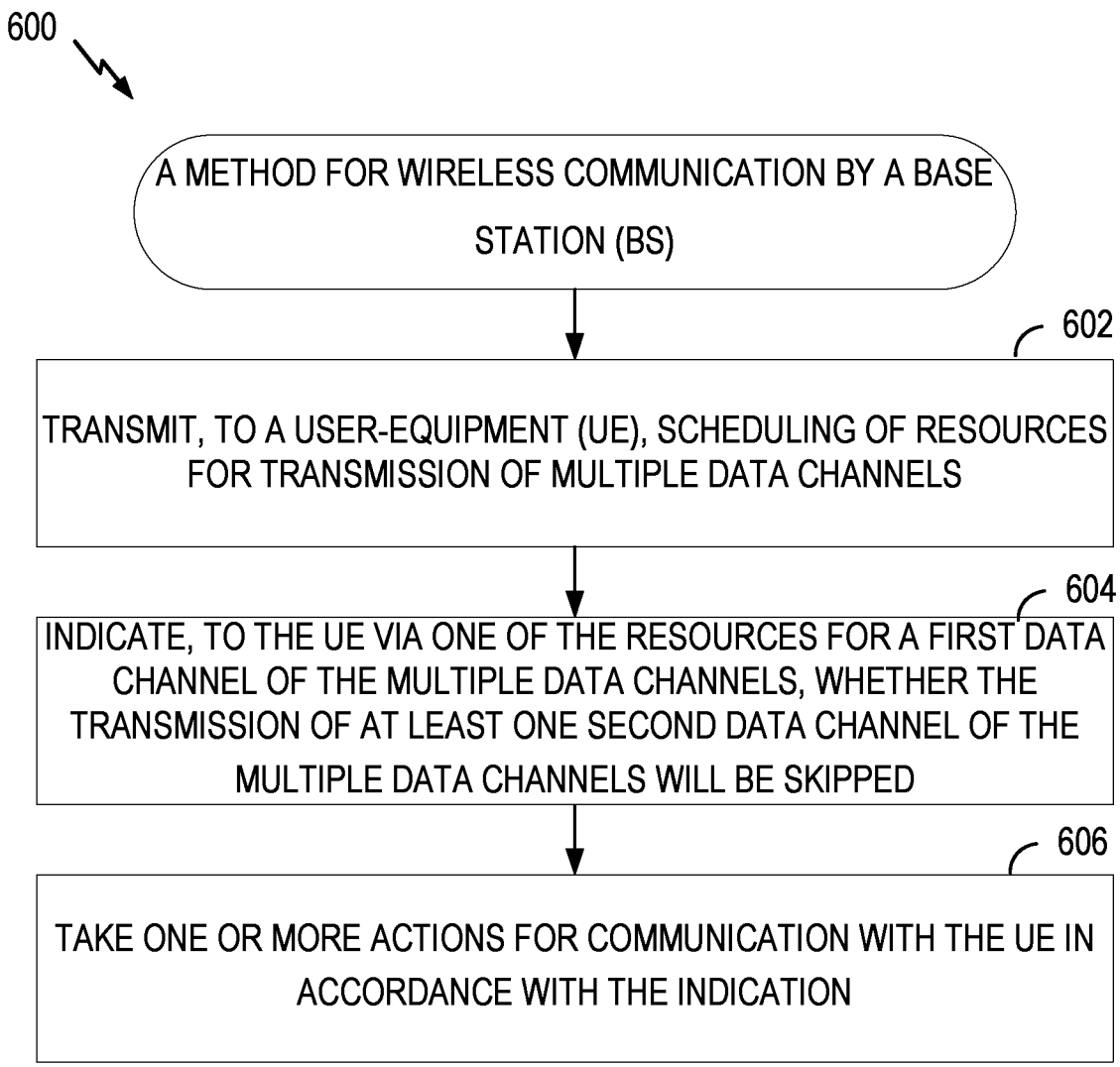
FIG. 6 is a flow diagram illustrating example operations for wireless communication by a base station.

FIG. 6 is a flow diagram illustrating example operations 600 for wireless communication, in accordance with certain aspects of the present disclosure. The operations 600 may be performed, for example, by a BS (e.g., such as the BS 102 in the wireless communication network 100 of FIG. 1).

The operations 600 performed by the BS may be complementary to the operations 500 of FIG. 5 performed by the UE. Operations 600 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 begin, at block 602, with the BS transmitting, to a UE, scheduling of resources for transmission of multiple data channels. For example, the multiple data channels may be scheduled using SPS.

At block 604, the BS may indicate, to the UE via a resource for a first data channel of the multiple data channels, whether the transmission of at least a second data channel of the multiple data channels will be skipped.

At block 606, the BS may take one or more actions associated with communication with the UE in accordance with the indication. For example, if it is determined that the second data channel will be skipped, the one or more actions may involve determining to forgo transmitting the second data channel, and in some cases, determining to forgo monitoring for HARQ signaling for the second data channel.

Figure 7A:
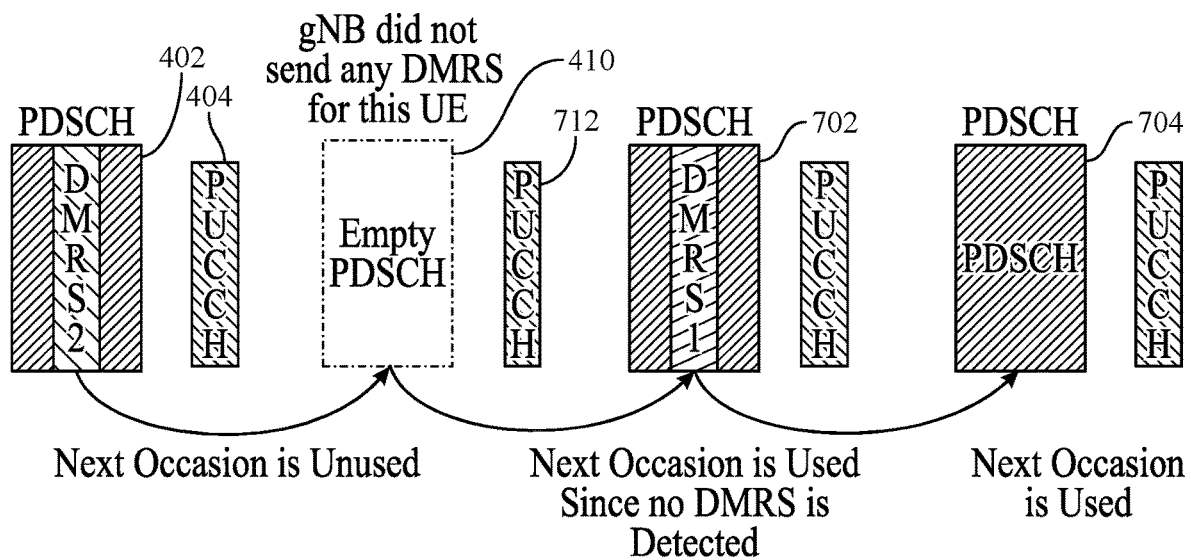
FIGS. 7A and 7B illustrate example techniques for indicating unoccupied physical downlink shared channel communication occasions for semi-persistent scheduling.
Figure 7B:
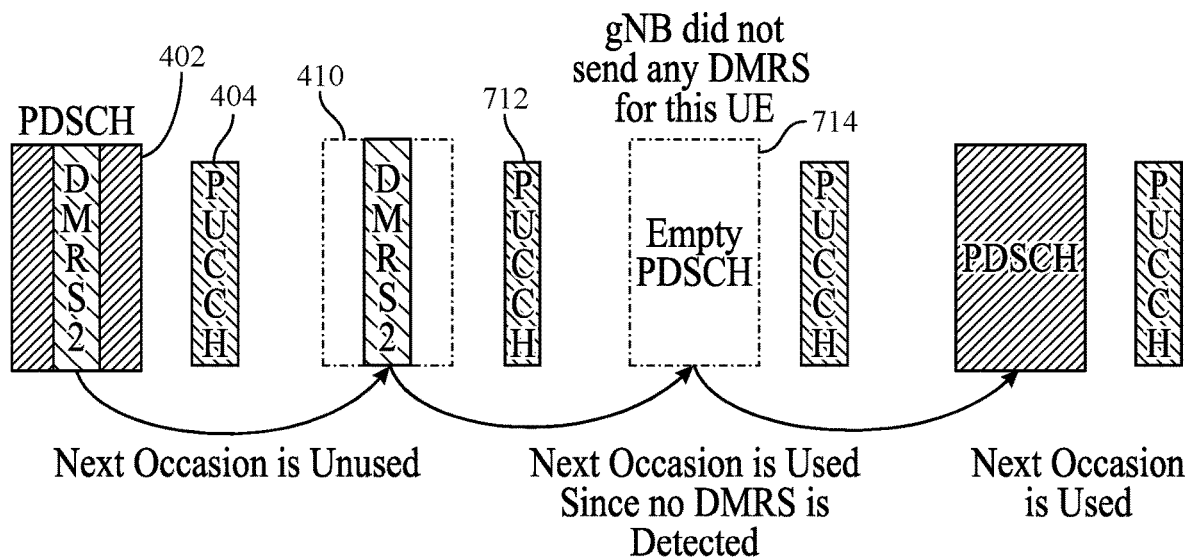

Examples of operations 500 and 700 are described with respect to FIGS. 7A and 7B.

FIGS. 7A and 7B illustrate example techniques for indicating unoccupied data channel occasions for SPS. In some aspects, multiple types of reference signals (e.g., demodulation reference signal (DMRS)) may be configured, allowing the BS to use the different types of reference signals to indicate to the UE whether one or more upcoming data channel occasions are to be used. For instance, two different DMRS sequences may be configured, such as a first DMRS sequence (referred to as "DMRS 1") and a second DMRS sequence (referred to as "DMRS 2"). DMRS 2 may be configured by changing odd or even elements signs of the sequence. In other words, DMRS 2 may be the same as DMRS 1, but with the odd or even elements signed flipped. One of the DMRS 1 or DMRS 2 may be used to indicate that a following (e.g., the next) data channel occasion is empty or not empty (e.g., skipped or not skipped). For instance, as illustrated, data channel 402 may include DMRS 2, which may indicate that the scheduled data channel for the next data channel occasion is skipped (e.g., no data channel is transmitted via the resources 410).

If no DMRS is detected during a data channel occasion (e.g., no DMRS is transmitted on resources 410), that may indicate to the UE that the next data channel occasion is used (e.g., data channel 702 is transmitted in the next data channel occasion). In other words, the BS may only include an indication (e.g., via a DMRS) in a data channel occasion when the next data channel is used, increasing power efficiency of the UE and the BS.

As shown, data channel 702 may include DMRS 1 which may indicate that the next data channel occasion is used. For example, DMRS 1 may indicate that data channel 704 is transmitted in the next data channel occasion for data channel 704.

In some aspects, a UE may forgo transmission of a PUCCH for a skipped data channel. For example, transmission of the PUCCH 712 (e.g., allocated for ACK/NACK for resources 410) may be skipped if the UE knows that the data channel transmission using resources 410 is skipped. Skipping transmission of PUCCH 712 may facilitate reduction of power consumption at the UE and reduce interference with other nodes.

In some aspects, although a data channel transmission may be skipped, the BS may still transmit a DMRS using the allocated resources (e.g., resources 410) to indicate to the UE that the next data channel occasion is also skipped. For example, as shown in FIG. 7B, even though no data channel is transmitted using resources 410, DMRS 2 may be transmitted using resources 410 to indicate to the UE that the data channel transmission is skipped during the next data channel occasion (e.g., no data channel transmission is to occur via scheduled resources 714).

Techniques for Indicating Skipped Data Channel Transmission Using a Transmission Pattern In some aspects, radio resource control (RRC) signaling or medium access control-control element (MAC-CE) may be used to indicate a bitmap (e.g., with a certain configured size N, where N is an integer greater than 1). The bitmap may indicate a pattern (e.g., also referred to herein as a transmission pattern) of used and unused data channel occasions when the UE detects a type of DMRS (e.g., DMRS 2). For example, if the size N is equal to 3 for a bitmap, the bitmap may include 3 bits, each indicating whether a data channel transmission is skipped. In some cases, the size N of the bitmap may be signaled to the UE separately from the bitmap itself. For example, the size N may be signaled via RRC, while the bitmap itself may be signaled in a MAC-CE or DCI. In other aspects, both the bitmap and size N may be signaled in DCI. The integer N may be an indication of a quantity of data channels associated with a transmission pattern indicated by a bitmap, and the bitmap may indicate whether each of the data channels is skipped.

The bitmap may be a simple indication of how many unused data channel occasions are upcoming when DMRS 2 is detected and how many used data channel occasions are upcoming when DMRS 1 is detected. These numbers may be RRC or MAC-CE configured. The bitmap may be a result of a known pattern of data traffic signaled in RRC or MAC-CE. In other words, the RRC or MAC-CE signaling may indicate that when DMRS 2 is received, a data channel transmission in a first upcoming data channel occasion is skipped, a data channel transmission in a second upcoming data channel occasion will occur, and a data channel transmission in a third upcoming data channel occasion is skipped.

In some aspects, multiple options of transmission patterns may be configured, allowing the BS to select one of the traffic patterns using an index. For example, each of the traffic patterns may be indicated using a bitmap. The SPS activation or reactivation DCI may be used to indicate the bitmap index among multiple predefined bitmaps that are configured via RRC or MAC-CE. For example, the DCI may indicate the index associated with one of the configured patterns, and the UE may determine the pattern of skipped and transmitted data channels accordingly.

RRC or MAC-CE may be used to define a list of M bitmaps (e.g., transmission patterns) each of quantity N bits signaled, as shown by the matrix:

$$\begin{bmatrix} a_{11} & \cdots & a_{1N} \\ \vdots & \ddots & \vdots \\ a_{M1} & \cdots & a_{MN} \end{bmatrix}$$

Each of the quantity N bits may indicate whether a corresponding data channel transmission is skipped. The BS may signals $\log_2(M)$ bits in the SPS activation or reactivation DCI to the UE indicating which of the M bitmaps is to be used (e.g., which bitmap indicates the pattern to be assumed when receiving DMRS 2). For example, referring to FIG. 7B, one of bitmaps may be selected, and the selected bitmap may indicate (e.g., based on transmission of DMRS 2 in data channel 402) that the data channel transmission scheduled for resources 410 is skipped, and the data channel transmission scheduled for resources 714 is skipped.

Example Wireless Communication Devices

Figure 8:
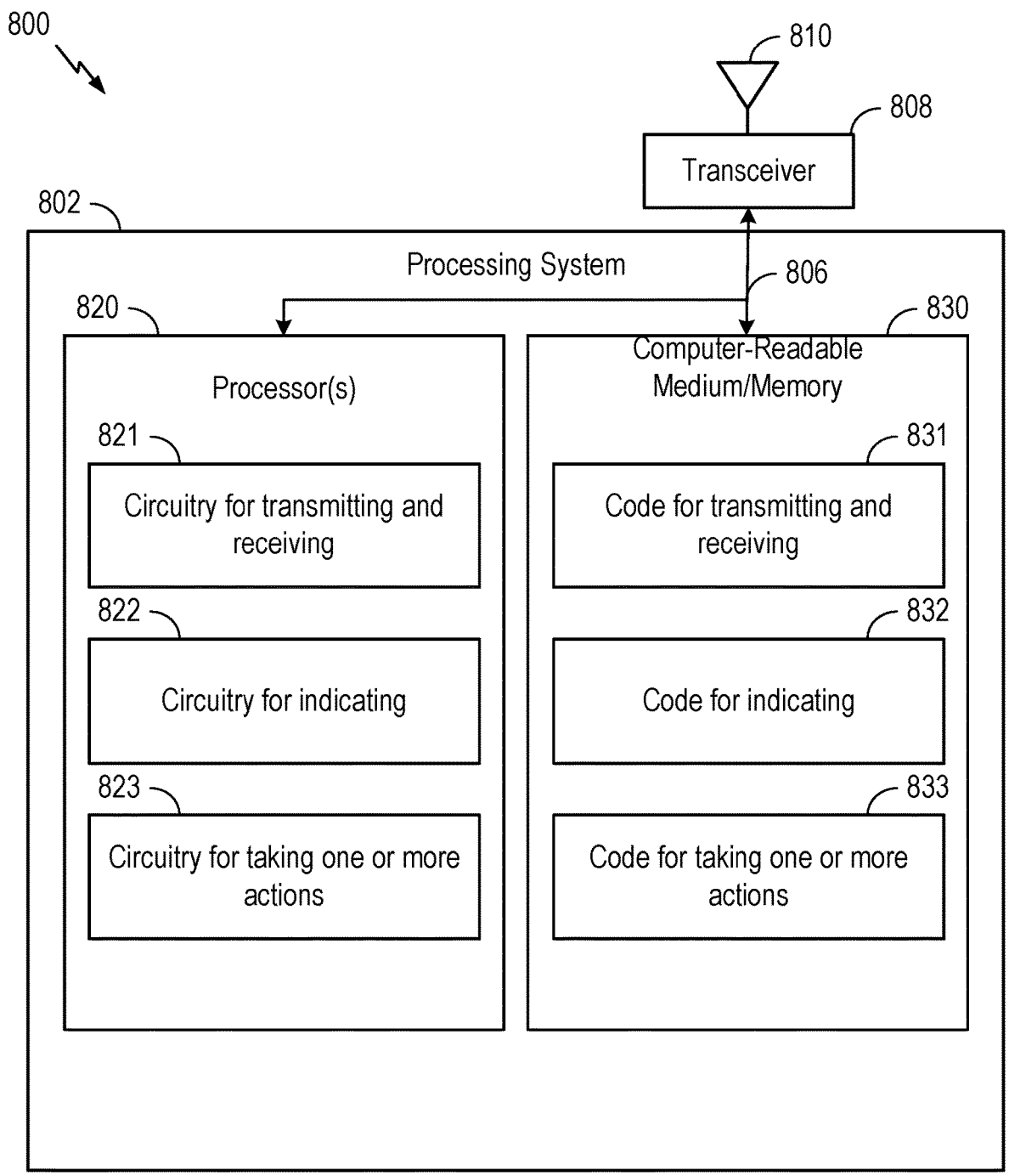
FIGS. 8 and 9 depict aspects of example communications devices.

FIG. 8 depicts an example communications device 800 that includes various components operable, configured, or adapted to perform operations for the techniques disclosed herein, such as the operations depicted and described with respect to FIGS. 4A-4C, 6, and 7A-7B. In some examples, communication device 800 may be a base station 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIGS. 4A-4C, 6, and 7A-7B, or other operations for performing the various techniques discussed herein for SPS.

In the depicted example, computer-readable medium/memory 830 stores code 831 for transmitting and receiving; code 832 for indicating; and code 833 for taking one or more actions.

In the depicted example, the one or more processors 820 include circuitry configured to implement the code stored in the computer-readable medium/memory 830, including circuitry 821 for transmitting and receiving; circuitry 822 for indicating; and circuitry 823 for taking one or more actions.

Various components of communications device 800 may provide means for performing the methods described herein, including with respect to FIGS. 4A-4C, 6, and 7A-7B.

In some examples, means for transmitting or sending (or means for outputting for transmission) may include the transceivers 232 and/or antenna(s) 234 of the base station 102 illustrated in FIG. 2 and/or transceiver 808 and antenna 810 of the communication device 800 in FIG. 8.

In some examples, means for receiving (or means for obtaining) may include the transceivers 232 and/or antenna(s) 234 of the base station illustrated in FIG. 2 and/or transceiver 808 and antenna 810 of the communication device 800 in FIG. 8.

In some examples, means for transmitting and receiving, means for indicating, and means for taking one or more actions may include various processing system components, such as: the one or more processors 820 in FIG. 8, or aspects of the base station 102 depicted in FIG. 2, including receive processor 238, transmit processor 220, TX MIMO processor 230, and/or controller/processor 240 (including SPS component 241).

Notably, FIG. 8 is just use example, and many other examples and configurations of communication device 800 are possible.

Figure 9:
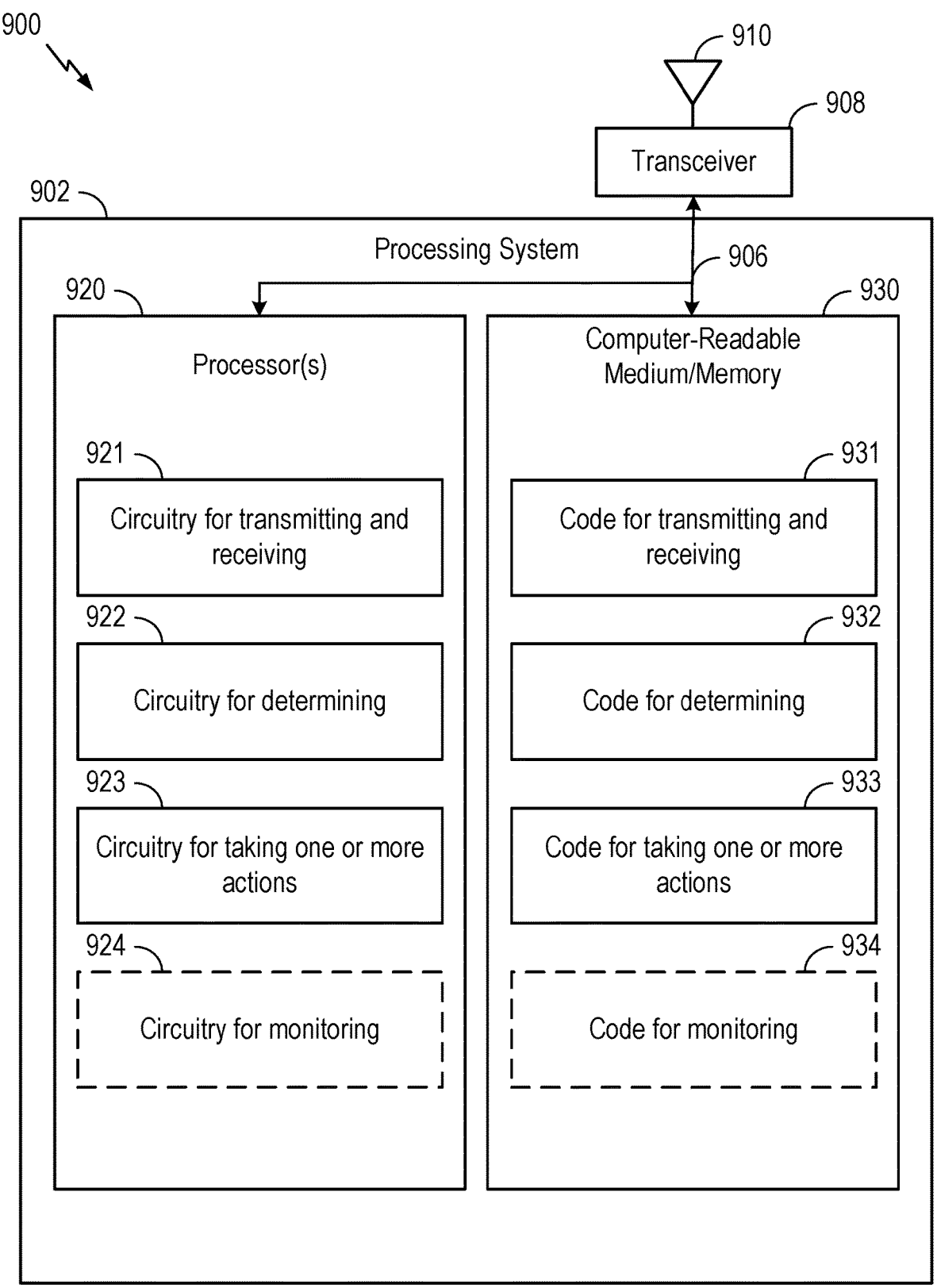

FIG. 9 depicts an example communications device 900 that includes various components operable, configured, or adapted to perform operations for the techniques disclosed herein, such as the operations depicted and described with respect to FIG. 5. In some examples, communication device 900 may be a user equipment 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 5, or other operations for performing the various techniques discussed herein for SPS.

In the depicted example, computer-readable medium/memory 930 stores: code 931 for receiving and transmitting; code 932 for determining; and code 933 for taking one or more actions. The computer-readable medium/memory 930 may optionally also store code 934 for monitoring.

In the depicted example, the one or more processors 920 include circuitry configured to implement the code stored in the computer-readable medium/memory 930, including circuitry 921 for receiving and transmitting; circuitry 922 for determining; and circuitry 923 for taking one or more actions. The one or more processors 920 may optionally also have circuitry 924 for monitoring.

Various components of communications device 900 may provide means for performing the methods described herein, including with respect to FIG. 5.

In some examples, means for transmitting or sending (or means for outputting for transmission) may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for transmitting, means for receiving, means for determining, means for taking one or more actions, and means for monitoring may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including SPS component 281).

Notably, FIG. 9 is just use example, and many other examples and configurations of communication device 900 are possible.

EXAMPLE CLAUSES

Implementation examples are described in the following numbered clauses:

Clause 1. A method for wireless communication by a user-equipment (UE), comprising: receiving, from a base station (BS), scheduling of resources for reception of multiple data channels; determining, based on a resource for a first data channel of the multiple data channels, an indication of whether transmission of at least a second data channel of the multiple data channels will be skipped; and taking one or more actions associated with communication with the BS in accordance with the indication.

Clause 2. The method of clause 1, wherein receiving the scheduling of the resources includes receiving the scheduling using semi-persistent scheduling (SPS).

Clause 3. The method of any one of clauses 1-2, wherein the determination is based on a type of reference signal received on the resource for the first data channel.

Clause 4. The method of any one of clauses 1-3, wherein determining the indication of whether transmission of the second data channel will be skipped comprises: receiving a first type of reference signal via the first data channel, the first type of reference signal being configured to indicate that the transmission of the second data channel will be skipped; or receiving a second type of reference signal via the first data channel, the second type of reference signal being configured to indicate that the transmission of the second data channel will occur.

Clause 5. The method of clause 4, wherein each of the first type of reference signal and the second type of reference signal comprises a demodulation reference signal (DMRS).

Clause 6. The method of any one of clauses 1-5, wherein determining the indication of whether transmission of the second data channel will be skipped comprises: monitoring the resource for the first data channel; and determining that the first data channel was not received on the resource based on the monitoring, wherein not receiving the first data channel indicates that the transmission of the second data channel will occur.

Clause 7. The method of any one of clauses 1-6, wherein: the second data channel is one of at least two data channels; and the indication of whether the transmission of the at least two data channels will be skipped is determined based on at least one transmission pattern associated with the at least two data channels, the at least one transmission pattern indicating whether each of the at least two data channels is skipped during a corresponding the resource for the first data channel.

Clause 8. The method of clause 7, further comprising receiving at least one message indicating the at least one transmission pattern.

Clause 9. The method of clause 8, wherein the indication of the at least one transmission pattern comprises an indication of a quantity of the at least two data channels and a bitmap indicating whether each of the at least two data channels is skipped.

Clause 10. The method of any one of clauses 8-9, wherein the at least one message comprises one or more of: downlink control information (DCI); a medium access control (MAC) control element (CE); or a radio resource control (RRC) message.

Clause 11. The method of any one of clauses 8-10, wherein: the at least one transmission pattern comprises multiple transmission patterns, the method further comprises: receiving another message identifying one of the multiple transmission patterns, and the indication of whether the transmission of the at least two data channels will be skipped is determined based on the identified one of the multiple transmission patterns.

Clause 12. The method of clause 11, wherein: the at least one message comprises multiple bitmaps, each of the multiple bitmaps indicating a respective one of the multiple transmission patterns; and the other message identifies one of the multiple transmission patterns using a bitmap index identifying one of the multiple bitmaps.

Clause 13. A method for wireless communication by a base station (BS), comprising: transmitting, to a user-equipment (UE), scheduling of resources for transmission of multiple data channels; indicating, to the UE via a resource for a first data channel of the multiple data channels, whether the transmission of at least a second data channel of the multiple data channels will be skipped; and taking one or more actions associated with communication with the UE in accordance with the indication.

Clause 14. The method of clause 13, wherein transmitting the scheduling of the resources includes transmitting the scheduling using semi-persistent scheduling (SPS).

Clause 15. The method of any one of clauses 13-14, wherein the indication is based on a type of reference signal transmitted on the resource for the first data channel.

Clause 16. The method of any one of clauses 13-15, wherein the indication of whether transmission of the second data channel will be skipped comprises: transmitting a first type of reference signal via the first data channel, the first type of reference signal being configured to indicate that the transmission of the second data channel will be skipped; or transmitting a second type of reference signal via the first data channel, the second type of reference signal being configured to indicate that the transmission of the second data channel will occur.

Clause 17. The method of clause 16, wherein the reference signal having the first type or the reference signal having the second type comprises a demodulation reference signal (DMRS).

Clause 18. The method of any one of clauses 13-17, wherein forgoing transmission of the first data channel indicates that the transmission of the second data channel will occur.

Clause 19. The method of any one of clauses 13-18, wherein: the second data channel comprises at least two data channels; and the indication of whether the transmission of the at least two data channels will be skipped is based on at least one transmission pattern associated with the at least two data channels, the at least one transmission pattern indicating whether each of the at least two data channels is skipped during a corresponding one of the scheduled resources.

Clause 20. The method of clause 19, further comprising transmitting at least one message indicating the at least one transmission pattern.

Clause 21. The method of clause 20, wherein the indication of the at least one transmission pattern comprises an indication of a quantity of the at least two data channels and a bitmap indicating whether each of the at least two data channels is skipped.

Clause 22. The method of any one of clauses 20-21, wherein the at least one message comprises one or more of: downlink control information (DCI); a medium access control (MAC) control element (CE); or a radio resource control (RRC) message.

Clause 23. The method of any one of clauses 20-22, wherein: the at least one transmission pattern comprises multiple transmission patterns, the method further comprises: transmitting another message identifying one of the multiple transmission patterns, and the indication of whether the transmission of the at least two data channels will be skipped is based on the identified one of the multiple transmission patterns.

Clause 24. The method of clause 23, wherein: the at least one message comprises multiple bitmaps, each of the multiple bitmaps indicating a respective one of the multiple transmission patterns; and the other message identifies one of the multiple transmission patterns using a bitmap index identifying one of the multiple bitmaps.

Clause 25: An apparatus, comprising: a memory comprising executable instructions; one or more processors configured to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management. Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for indicating of unoccupied data channel occasions for semi-persistent scheduling in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user-equipment (UE), comprising:
   receiving, from a base station (BS), scheduling of resources for reception of data via multiple data channels;
   determining, based on whether first data was received from the BS via a resource for a first data channel of the multiple data channels, whether reception of second data from the BS via at least a second data channel of the multiple data channels will not occur; and
   performing one or more actions associated with communication with the BS in accordance with the determination.

2. The method of claim 1, wherein receiving the scheduling of the resources includes receiving the scheduling using semi-persistent scheduling (SPS).

3. The method of claim 1, wherein the first data comprises a reference signal, and wherein the determining comprises determining based on a type of the reference signal.

4. The method of claim 1, wherein the first data comprises a reference signal, and wherein the determining the comprises:
   when the reference signal is a first type of reference signal, determining that the reception of the second data via the second data channel will not occur; or
   when the reference signal is a second type of reference signal, determining that the reception of the second data via the second data channel will occur.

5. The method of claim 4, wherein each of the first type of reference signal and the second type of reference signal comprises a demodulation reference signal (DMRS).

6. The method of claim 1, wherein the determining comprises:
   monitoring the resource for the first data channel;
   determining that the first data was not received on the resource based on the monitoring; and
   in response to the first data not being received, determining that the reception of the second data via the second data channel will occur.

7. The method of claim 1, wherein:
   the second data channel is one of at least two data channels; and
   determining whether the reception of the second data via the one of at least two data channels will not occur comprises determining whether the reception of the second data via the one of at least two data channels based on at least one transmission pattern associated with the at least two data channels, the at least one transmission pattern indicating whether each of the at least two data channels will occur during a corresponding occasion for the resource for the first data channel.

8. The method of claim 7, further comprising receiving at least one message indicating the at least one transmission pattern.

9. The method of claim 8, wherein the indication of the at least one transmission pattern comprises an indication of a quantity of the at least two data channels and a bitmap indicating whether each of the at least two data channels will occur.

10. The method of claim 8, wherein the at least one message comprises one or more of:
    downlink control information (DCI);
    a medium access control (MAC) control element (CE); or
    a radio resource control (RRC) message.

11. The method of claim 8, wherein:
    the at least one transmission pattern comprises multiple transmission patterns,
    the method further comprises: receiving a second message identifying one of the multiple transmission patterns, and
    the indication of whether the reception via the at least two data channels will not occur is determined based on the identified one of the multiple transmission patterns.

12. The method of claim 11, wherein:
    the at least one message comprises multiple bitmaps, each of the multiple bitmaps indicating a respective one of the multiple transmission patterns; and
    the second message identifies one of the multiple transmission patterns using a bitmap index identifying one of the multiple bitmaps.

13. A method for wireless communication by a base station (BS), comprising:
    transmitting, to a user-equipment (UE), scheduling of resources for transmission of data via multiple data channels;
    indicating, using first data sent to the UE via a resource for a first data channel of the multiple data channels, whether transmission of second data to the UE via at least a second data channel of the multiple data channels will be skipped; and
    performing one or more actions associated with communication with the UE in accordance with the indication.

14. The method of claim 13, wherein transmitting the scheduling of the resources includes transmitting the scheduling using semi-persistent scheduling (SPS).

15. The method of claim 13, wherein the first data comprises a reference signal, and wherein the indication is based on a type of the reference signal.

16. The method of claim 13, wherein the first data comprises a reference signal, and wherein the indication of comprises:
- transmitting the reference signal as a first type of reference signal to indicate that the transmission of the second data channel will be skipped; or
- transmitting the reference signal as a second type of reference signal to indicate that the transmission of the second data channel will occur.

17. The method of claim 16, wherein the reference signal having the first type or the reference signal having the second type comprises a demodulation reference signal (DMRS).

18. The method of claim 13, wherein:
- the second data channel comprises one of at least two data channels; and
- indicating whether the transmission of the second data via the one of at least two data channels will be skipped is based on at least one transmission pattern associated with the at least two data channels, the at least one transmission pattern indicating whether each of the at least two data channels is skipped during a corresponding occasion for the first data channel.

19. The method of claim 18, further comprising transmitting at least one message indicating the at least one transmission pattern.

20. The method of claim 19, wherein the indication of the at least one transmission pattern comprises an indication of a quantity of the at least two data channels and a bitmap indicating whether each of the at least two data channels is skipped.

21. The method of claim 19, wherein the at least one message comprises one or more of:
- downlink control information (DCI);
- a medium access control (MAC) control element (CE); or
- a radio resource control (RRC) message.

22. The method of claim 19, wherein:
- the at least one transmission pattern comprises multiple transmission patterns,
- the method further comprises: transmitting another message identifying one of the multiple transmission patterns, and
- the indication of whether the transmission of the at least two data channels will be skipped is based on the identified one of the multiple transmission patterns.

23. The method of claim 22, wherein:
- the at least one message comprises multiple bitmaps, each of the multiple bitmaps indicating a respective one of the multiple transmission patterns; and
- the other message identifies one of the multiple transmission patterns using a bitmap index identifying one of the multiple bitmaps.

24. An apparatus for wireless communication by a user-equipment (UE), comprising:
- a memory having executable instructions; and
- one or more processors configured to execute the executable instructions and cause the apparatus to:
  - receive, from a base station (BS), scheduling of resources for reception of multiple data channels;
  - determine, based on whether first data was received from the BS via a resource for a first data channel of the multiple data channels, whether reception of second data from the BS via at least a second data channel of the multiple data channels will not occur; and
  - perform one or more actions associated with communication with the BS in accordance with the determination.

25. The apparatus of claim 24, wherein receiving the scheduling of the resources includes receiving the scheduling using semi-persistent scheduling (SPS).

26. The apparatus of claim 24, wherein the first data comprises a reference signal, and wherein the determination is based on a type of the reference signal.

27. The apparatus of claim 24, wherein the first data comprises a reference signal, and wherein the determination comprises:
- when the reference signal is a first type of reference signal, that the reception of the second data via the second data channel will not occur; or
- when the reference signal is a second type of reference signal, that the reception of the second data via the second data channel will occur.

28. The apparatus of claim 27, wherein each of the first type of reference signal and the second type of reference signal comprises a demodulation reference signal (DMRS).

29. An apparatus for wireless communication by a base station (BS), comprising:
- a memory having executable instructions; and
- one or more processors configured to execute the executable instructions and cause the apparatus to:
  - transmit, to a user-equipment (UE), scheduling of resources for transmission of multiple data channels;
  - indicate, using first data sent to the UE via a resource for a first data channel of the multiple data channels, whether transmission of second data to the UE via at least a second data channel of the multiple data channels will be skipped; and
  - perform one or more actions associated with communication with the UE in accordance with the indication.

* * * * *